US00RE43397E

(19) United States
(12) Reissued Patent
Rogers et al.

(10) Patent Number: US RE43,397 E
(45) Date of Reissued Patent: May 22, 2012

(54) WEIGHTLIFTING RACK

(75) Inventors: Orley David Rogers, Sanford, MI (US); John Steven York, Jr., Midland, MI (US); Kenneth Edward Staten, Clare, MI (US); Zachary Jason Loucks, Mount Pleasant, MI (US); Timothy John Hockemeyer, Midland, MI (US)

(73) Assignee: Rogers Athletic Company, Clare, MI (US)

(21) Appl. No.: 29/354,218

(22) Filed: Jan. 21, 2010

Related U.S. Patent Documents

Reissue of:
(64) Patent No.: Des. 550,793
Issued: Sep. 11, 2007
Appl. No.: 29/251,303
Filed: Jan. 5, 2006

(51) LOC (9) Cl. ..... 21-02
(52) U.S. Cl. ..... D21/694
(58) Field of Classification Search ..... D21/662, D21/686, 674–676, 690–691, 694; 482/94–98, 482/104, 106, 108, 129–130, 133, 135–138, 482/142, 145
See application file for complete search history.

(56) References Cited

U.S. PATENT DOCUMENTS

| | | | | | |
|---|---|---|---|---|---|
| D265,111 | S | * | 6/1982 | Lynn | D21/673 |
| 4,750,739 | A | * | 6/1988 | Lange | 482/104 |
| 4,861,024 | A | | 8/1989 | Lee | |
| 5,184,992 | A | * | 2/1993 | Banks | 482/104 |
| 5,215,510 | A | | 6/1993 | Baran | |
| D358,623 | S | * | 5/1995 | Macasieb | D21/691 |
| 5,669,859 | A | * | 9/1997 | Liggett et al. | 482/94 |
| D408,480 | S | * | 4/1999 | Haugo | D21/691 |
| D444,827 | S | | 7/2001 | Mobley | |
| D454,930 | S | * | 3/2002 | Novak | D21/686 |
| 6,605,023 | B1 | | 8/2003 | Mobley | |
| 6,623,407 | B2 | | 9/2003 | Novak et al. | |
| 6,623,409 | B1 | * | 9/2003 | Abelbeck | 482/104 |
| 6,669,607 | B2 | * | 12/2003 | Slawinski et al. | 482/104 |
| 6,746,379 | B1 | * | 6/2004 | Brawner | 482/104 |
| 6,926,649 | B2 | * | 8/2005 | Slawinski | 482/104 |
| 7,338,416 | B2 | * | 3/2008 | Smith | 482/104 |
| D590,032 | S | * | 4/2009 | Webber et al. | D21/673 |
| 7,641,602 | B2 | * | 1/2010 | Rogers et al. | 482/100 |

* cited by examiner

*Primary Examiner* — Susan E Krakower
(74) *Attorney, Agent, or Firm* — Carlson Gaskey & Olds P.C.

(57) CLAIM

We claim the ornamental design for the weightlifting rack, as shown and described.

DESCRIPTION

FIG. 1 is a perspective view of [the] *a weightlifting rack* invention[.]*;*
FIG. 2 is an enlarged perspective view of a fragment of the weightlifting rack[.] *invention;*
FIG. 3 is a side view of the invention[.]*;*
FIG. 4 is a top view of the invention*; and,*
FIG. 5 is a front view of the invention.
The broken line portions of the weightlifting rack *invention disclosed herein* are included for the purpose of illustrating environmental structure and form no part of the claimed design.

1 Claim, 5 Drawing Sheets

Matter enclosed in heavy brackets [ ] appears in the original patent but forms no part of this reissue; matter printed in italics indicates the additions made by reissue.

AMENDED

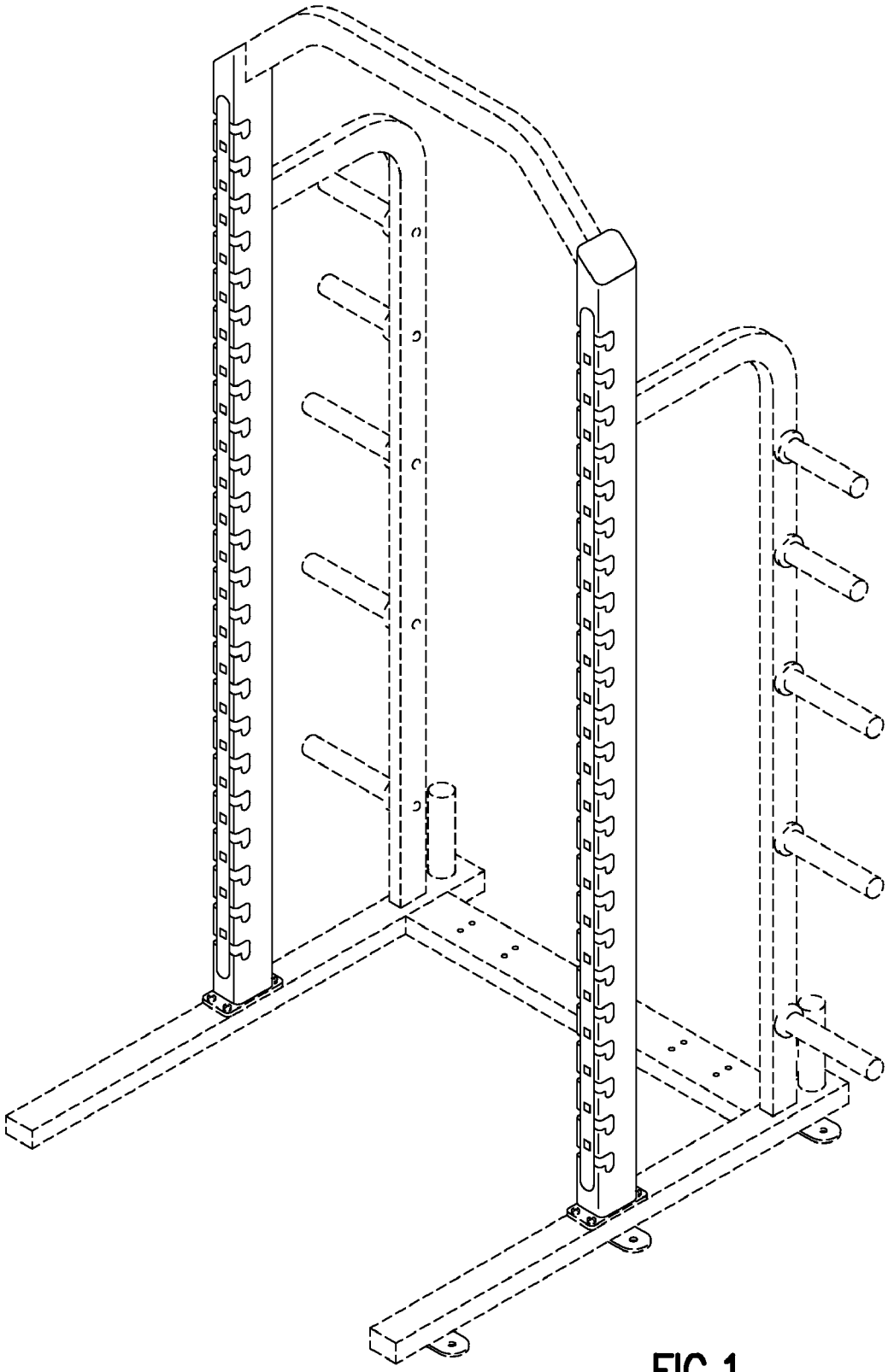
FIG.1
AMENDED

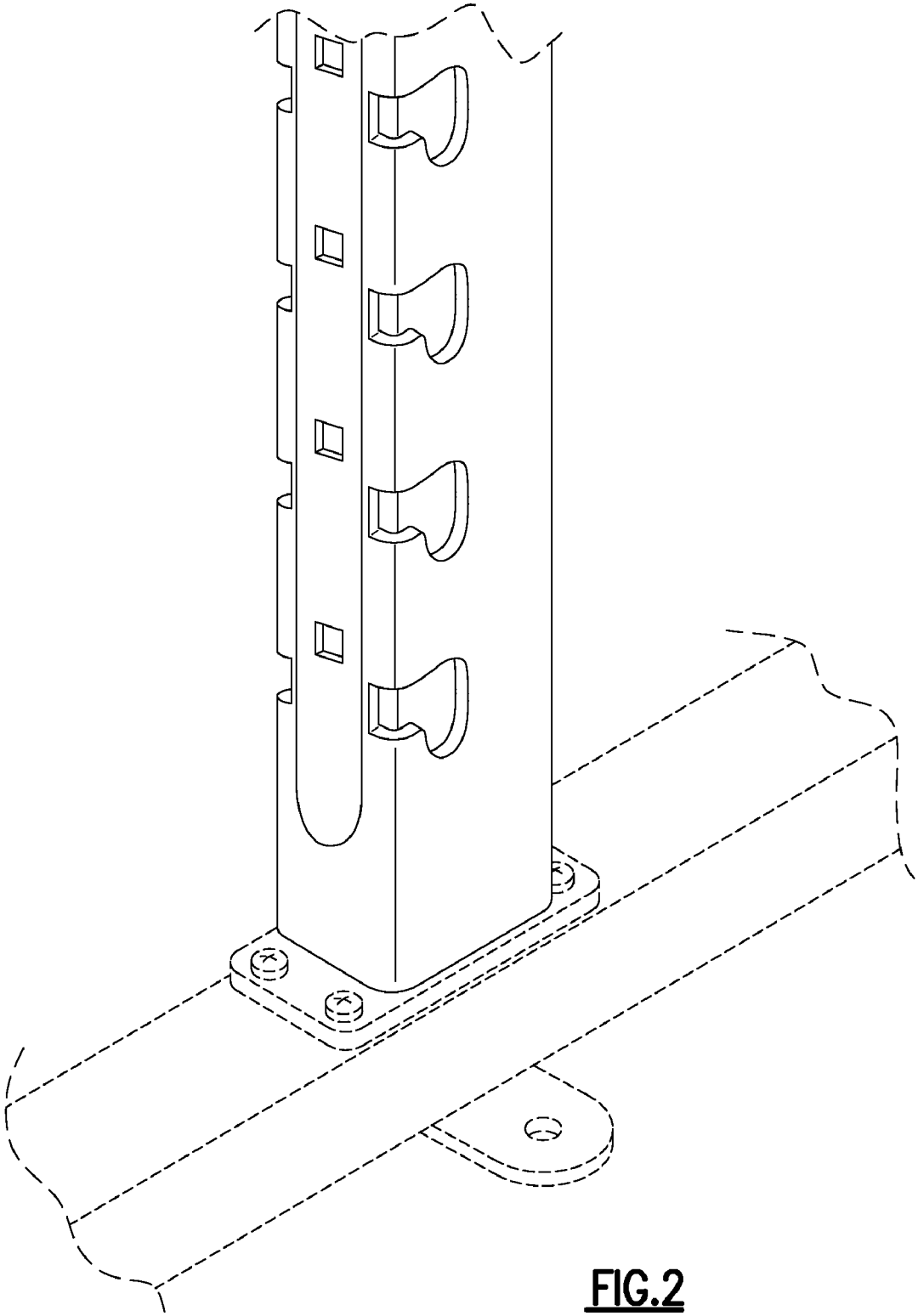
FIG.2
AMENDED

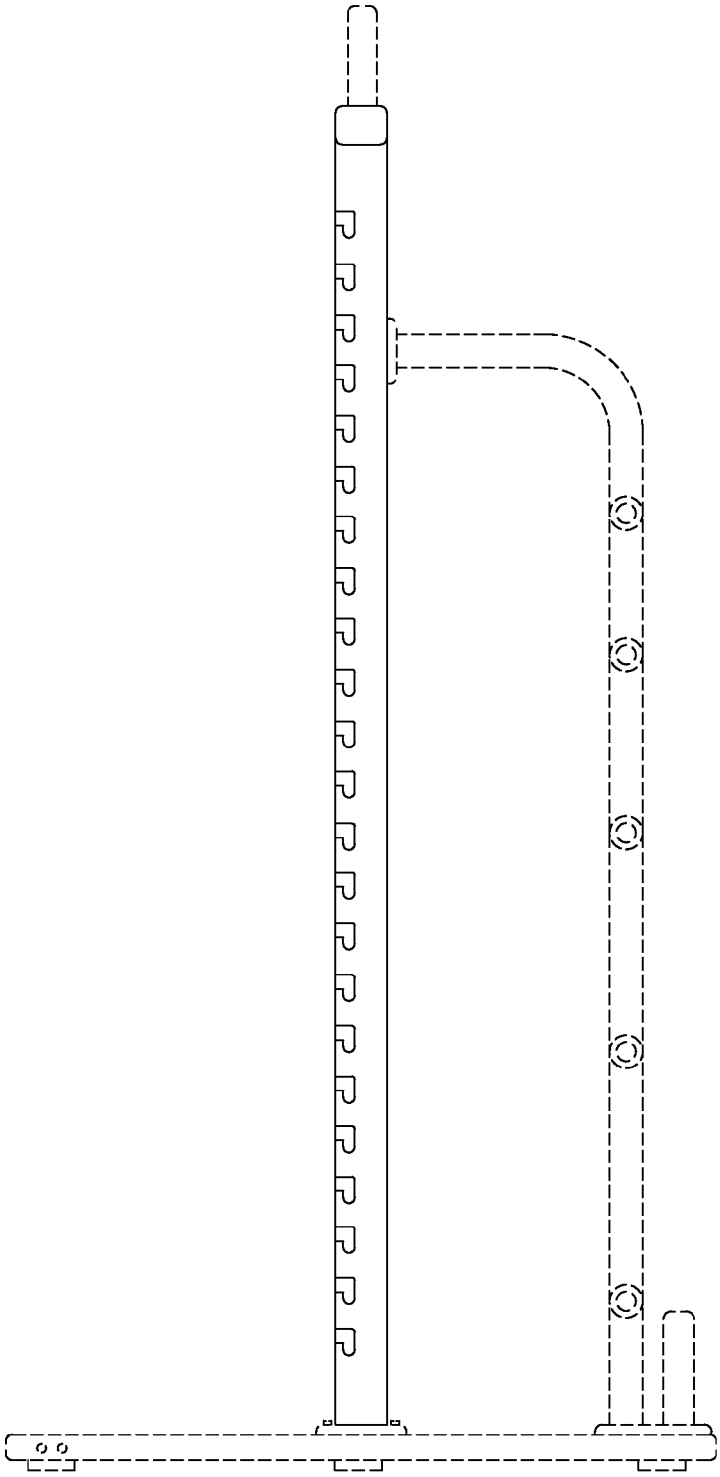
FIG.3
AMENDED

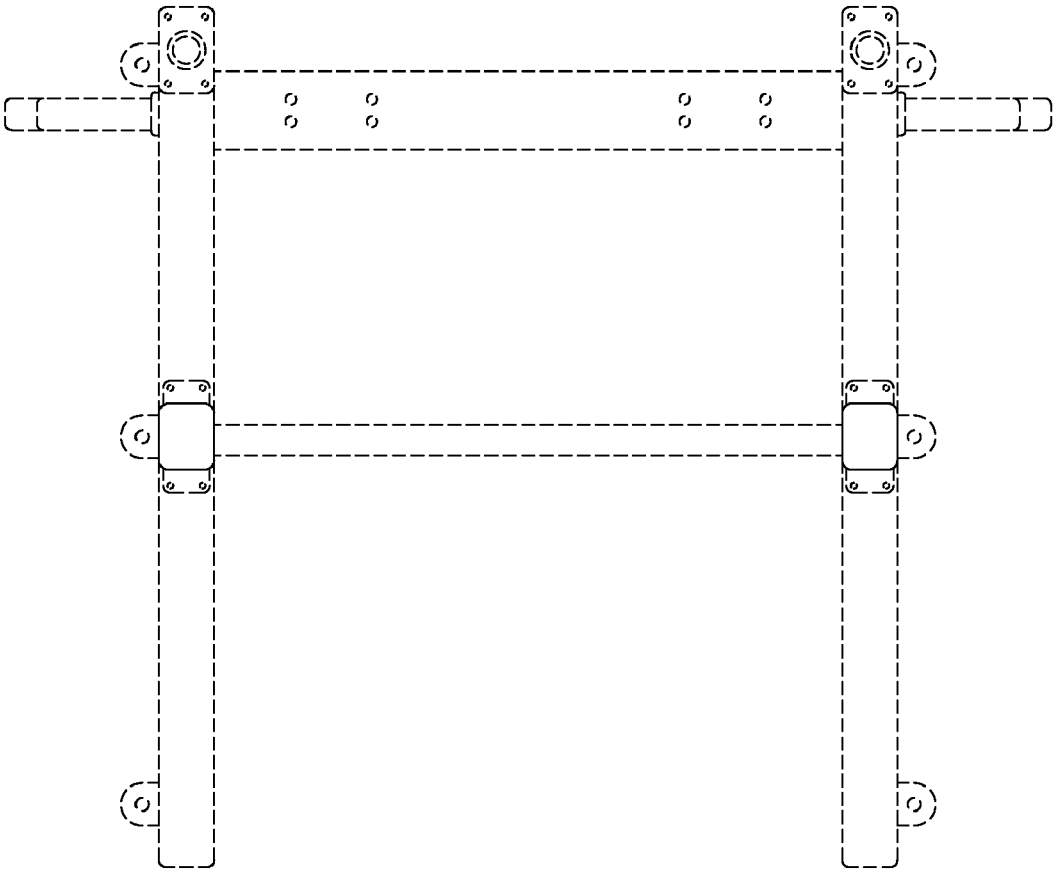
FIG.4
AMENDED

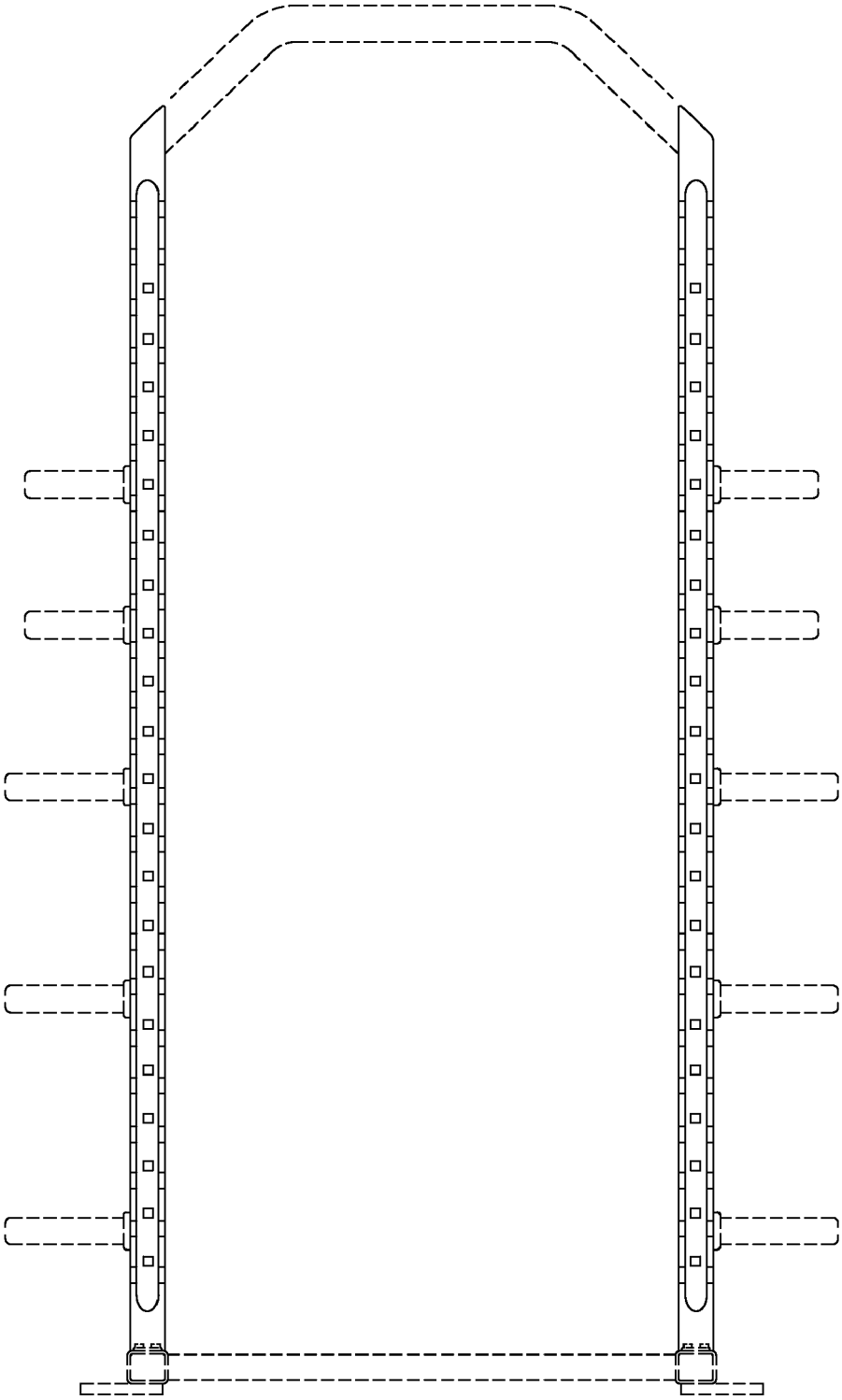
FIG.5
AMENDED

UNITED STATES PATENT AND TRADEMARK OFFICE

CERTIFICATE OF CORRECTION

PATENT NO. : RE43,397 E
APPLICATION NO. : 29/354218
DATED : May 22, 2012
INVENTOR(S) : Rogers et al.

It is certified that error appears in the above-identified patent and that said Letters Patent is hereby corrected as shown below:

Title Page, Col. 2, lines 3-6;

IN THE DESCRIPTION:

The description of Figure 2 should read as follows:

FIG. 2 is an enlarged perspective view of a fragment of the weightlifting rack *invention*[.];

The description of Figure 3 should read as follows:

FIG. 3 is a side view of the invention;[.]

The description of Figure 4 should read as follows:

FIG. 4 is a top view of the invention[.]; and

Signed and Sealed this
Fourth Day of September, 2012

David J. Kappos

David J. Kappos
*Director of the United States Patent and Trademark Office*